April 27, 1954  L. R. PISTOLES  2,677,125
GAUGE
Filed Feb. 16, 1952  2 Sheets-Sheet 1
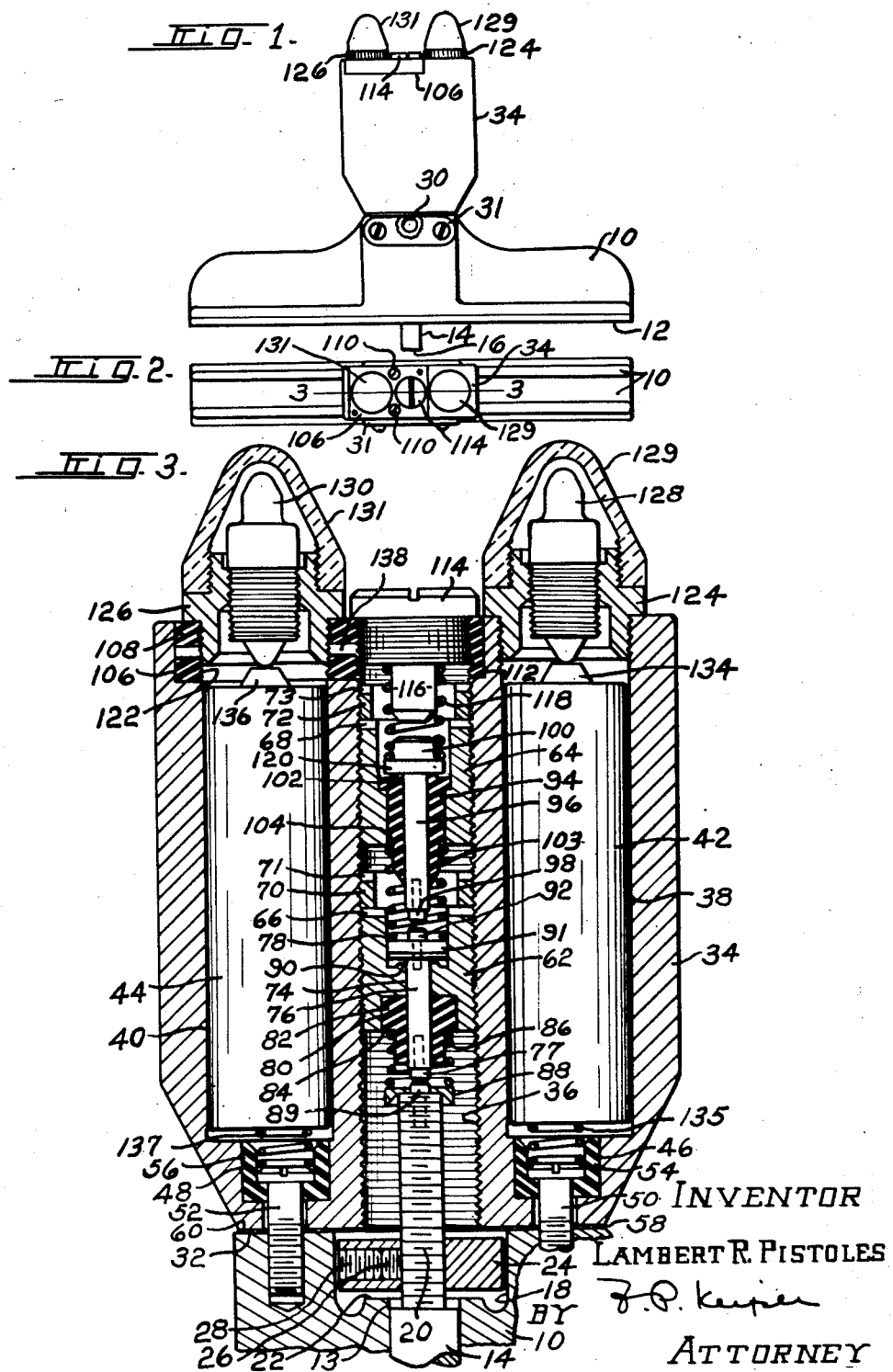
INVENTOR
LAMBERT R. PISTOLES
BY
ATTORNEY

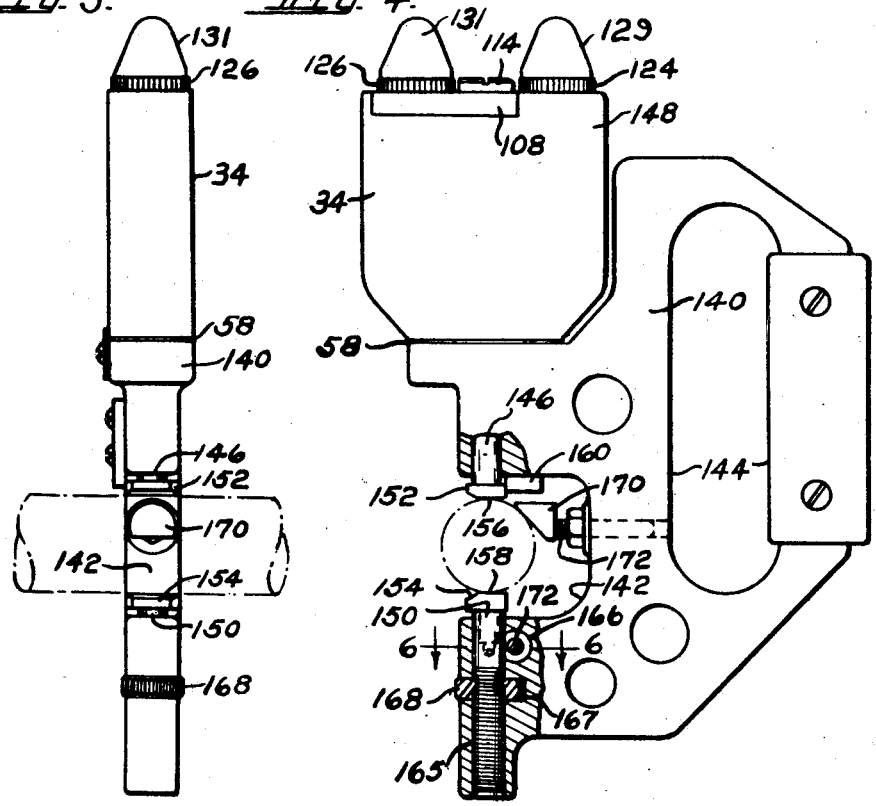

Patented Apr. 27, 1954

2,677,125

UNITED STATES PATENT OFFICE 2,677,125

GAUGE

Lambert R. Pistoles, Wilmington, Del.

Application February 16, 1952, Serial No. 271,917

15 Claims. (Cl. 340—265)

This invention relates to pin or snap type gages, and more particularly to such gages adapted to utilize electrical indications.

In an application Serial No. 62,738, filed November 30, 1948, there is disclosed a pin type of gage indicating through a dial indicator. Such a gage requires an operator to accurately read a dial indication in order to determine a gaged dimension. Other gages such as the flush pin type depend on feel. All depend to some extent upon the skill and understanding of the operator.

The present invention is directed toward a gage having electrical indications, and in which the skill necessary for accurate gaging operations is minimized. The invention is more particularly directed to a gage embodying visual signal lamps, which by their illumination or color readily indicate whether the part being gaged falls within the tolerance limits for which the gage is set. The invention further has to do with the construction and arrangement of parts resulting in a rugged gage structure of a handy size capable of reliably gaging a dimension and indicating immediately whether the dimension of a part is within, beyond, or below the tolerances prescribed for the part. In addition, the structure is such as to be readily set to a required dimension and the tolerance limits.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had to the appended claims for this purpose.

In the drawings, wherein like reference characters indicate like parts:

Figure 1 is a side elevation of a gage adapted to measure depth embodying electrical indicating means;

Figure 2 is a top elevational view of the gage of Figure 1;

Figure 3 is an enlarged longitudinal sectional view of the gage taken substantially on the line 3—3 of Figure 2;

Figure 4 is a side elevational view with parts in section of a modified gage application embodying the electrical indicating means;

Figure 5 is an end elevational view of the gage shown in Figure 4; and

Figure 6 is a sectional view taken on the line 6—6 of Figure 5.

Referring to Figures 1-3, inclusive, there is shown a gage frame member 10 having a gage face 12, which may be hardened, such gage frame having an aperture 13 therein, normal to the face in which is slidably mounted a gage pin 14. The gage pin 14 may have an end gaging surface 16 parallel with the gage face 12. The body or frame member 10 is provided with an enlarged recess 18 in its upper portion through which a reduced diameter threaded shank portion 20 of the gage pin 14 extends. Such recess is provided with an annular shoulder 22 adapted to engage a collar 24 threadedly mounted on the shank 20, the collar being adjustably positioned on the shank and held by an initial soft set screw 26 backed up by a locking set screw 28. Such set screws may be of the socket head type and reached for adjustment through an aperture 30 in the side wall of the frame 10. Such aperture may be normally covered by a plate 31.

Mounted upon the upper face 32 of the frame is an indicator assembly comprising a main casing 34, such casing having a central threaded bore 36 extending lengthwise therethrough, and laterally disposed cylindrical recesses 38 and 40 of a length and diameter to conveniently receive flashlight type dry cells 42 and 44. The lower ends of the recesses are provided with shouldered extension bores 46 and 48, adapted to receive headed fastening screws 50 and 52 threaded into the frame 10. To provide proper insulation for the electrical circuits hereinafter to be referred to, the heads of the screws 50 and 52 are received in shouldered insulating sleeves or cups 54 and 56, and the shanks of such screws are of a diameter so as to avoid contact with the casing 34. A suitable sheet of insulating material 58 is interposed between the lower end of the casing and the upper face 32 of the frame. The threaded bore 36 is of lesser diameter than the collar 24, so that the lower surface 60 of the casing acts through the insulation 58 as a stop, limiting upward movement in the other direction. Adequate movement is allowed the collar so that the gage pin may move from a position well beyond the dimension to be gaged plus the allowable tolerance in either direction.

Within the threaded bore 36 are positioned threaded plug members 62 and 64, each of which members are castellated at their upper ends as at 66 and 68 so as to be reached by a tubular wrench having a mating castellated end. Each of the plugs is adapted to be locked in place by annular threaded sleeve-like members 70 and 72, adapted to jam against the rim of the upper faces of the plug members 62 and 64. Such sleeve members are also provided with castellated ends 71 and 73 for wrench engagement. It will be observed that the radial thickness of the sleeve members is less than the radial thickness of the castellated end portions of the plug members so that through telescopic tubular wrenches having mating castellated ends, the plug members may be held against turning while the sleeve members are turned and jammed into locking position.

The plug member 62 has a central aperture 74 extending therethrough in which a slidable pin 76 is positioned. Such pin is provided with a lower contact screw 77. Such aperture opens into shoulder recesses 78 and 80 above and below, respectively, the recess 80 being fitted with an insulating collar or bushing 82 having a shoulder 84 upon which is seated a light compression coil spring 86. Such spring bears at its lower end upon a cap seat member 88 mounted on the upper end of the pin shank 20, and is held in position by a contact screw 89. The upper recess 78 is provided with raised shoulder 90 forming an annular lip around the aperture 74, such lip being adapted to engage a head collar or disk 91 rigidly secured on the end of the pin 76 by a contact screw 92. Such lip or shoulder 90 forms a rigid abutment or stop for accurately limiting movement of the pin 76 downward, by reason of engagement with the head 91.

The upper plug member 64 is provided with a central insulating bushing 94 rigidly secured therein, and in which there is slidably mounted a coaxial pin 96, having a contact screw 98 mounted in its lower end. The upper end of the pin is provided with a shouldered head 100 adapted to accurately seat upon the annular raised lip 102 of the bushing 94 to positively and accurately limit downward movement of the pin 96. The lower end of the bushing 94 extends below the plug 64 and acts as a central guide for a coil compression spring 103 seated on a shoulder 104 of the bushing, such spring extending into engagement at its other end with the head 91.

The casing 34 is cut away at its upper end to provide a rectangular recess 106 into which is fitted an insulating block 108, such recess extending over the central threaded bore 36 and the recess 40. Such block may be suitably provided with dowel pins to locate the same in the recess, and is held in position by screws such as 110 (see Figure 2) threaded into the casing 34. The block 108 is provided with a bore 112 in alignment with the bore 36, which bore may be threaded in extension of the threads extending along the length of bore 36. A metal screw 114 is inserted into the bore 112, such screw being provided with a central boss 116 acting as an abutment to limit movement of the pin 96 in an upward direction by engaging the pin head 100. A compression coil spring 118 seated on the shoulder 120 of the head 100 and bearing against the under side of the head of screw 114, urges the head of such pin into seating position on the annular lip 102. Collar 24 will engage insulation stop 58 before the head 100 can approach boss 116, thus protecting the contacts from violent impacts.

The insulating block 108 is provided with a second aperture 122, in alignment with the cylindrical cell recess 40. Such aperture 122 is threaded to receive a lamp socket 126, and the upper end of the cylindrical cell recess 38 is similarly threaded to receive a companion lamp socket 124. Arranged within such lamp sockets are miniature electric light bulbs 128 and 130. The light bulb 128 is housed in a transparent glass or plastic cap 129, preferably green, whereas the light bulb 130 is housed in a similar cap 131, preferably red.

Electrical connections are established for the green light bulb 128 by contact of the bulb with the end pole 134 of a cell 42, the other end being supported upon a coil spring 135 seated within the cup 54 and bearing on the screw 50. A circuit, which may be closed by engagement of contacts 77 and 89, will thus be established through screw 50, frame 10, pin 14, shank 20, pin 76, plug 62, casing 34 and socket member 124.

Electrical connections for the red bulb 130 are established by contact of the bulb end with the end pole 136 of cell 44, the other end pole of which is resiliently supported on a coil spring 137 seated in the cup 56 and against the screw 52. When contacts 77 and 89 are closed, and also contacts 92 and 98, a circuit is established from the frame 10 through pin 14, shank 20, pin 76, pin 96, coil spring 118, to the screw cap 114. By means of a soft pin 138, for example of aluminum, arranged in a bore in the insulating block wall between the aperture 112 and the aperture 122, a connection is completed to the light socket 126.

Operation of the gage will readily appear from the foregoing description. The block 62 is set within the bore so that contacts 89 and 77 will close when the gage pin is moved upward to the lower tolerance limit. Thereafter, plug 64 is set within the bore so that contacts 92 and 98 will close when the gage pin is moved upward a further distance to the upper tolerance limit. It will thus appear that if neither light is energized, a work piece having a dimension less than the minimum tolerance is present. If the green light only glows, the work piece is within the tolerance, and if both green and red lights flash, the work piece is beyond the tolerance. Single cell flashlight batteries and low current light bulbs are employed to keep the current flow at a minimum. Silver contacts, operating at such low voltage and current as is present with a single cell and low current bulb act to accurately indicate when contact is made or broken so as to provide an accurate immediate visible indication, readily understood by unskilled gage operators. The gage while being used may be observed from a distance by foremen, who heretofore could not check the gaging operations of an individual employing a flush pin type gage.

In Figures 4–6, inclusive, the indicator portion of the gage is adapted to a gage having a C-frame for gaging diameters. As shown, the frame 140 comprises a C-opening 142, handle 144, a slidable gage pin 146, and indicator assembly 148, and an opposed settable abutment 150. Both the pin 146 and abutment 150 are provided with hardened rectangular buttons 152 and 154, each having parallel gaging flats 156 and 158. The pin 146 may be held from rotation on its axis by engagement of one edge of the button 152 with a stationary abutment 160.

The settable abutment 150 comprises a shank 162 slidable in an aperture 164, aligned with the gage pin 146. Such aperture intersects with a transverse offset bore 166, in which are positioned clamping members 168 and 170, adapted to be drawn together by a screw 172, so as to engage the shank 162. Slidable adjustment of the shank 162 in the aperture 164 is facilitated by a threaded lower end 165, and a deep slot 167 traversing the aperture 164, in which is positioned a knurled ring nut 168, threaded on the end 165. An adjustable stop 170 may be affixed within the C-opening on a threaded shank 172 extending at right angles to the pin axis, such stop serving, when properly set, to assure correct positioning of the gage upon a work piece for accurate gaging. The indicating assembly thus described operates in the same manner as previously described, except where a different dimension is to be set and utilizing the same tolerances, such change to the new dimension may be effected by moving the settable abutment 150, without disturbing the plugs 62 and 64. (See Figure 3).

While a single modification, with adaptation to two forms of gages, has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a gage, a gage frame, a rigid gage pin slidably mounted therein, means for establishing positive limits to a range of sliding movement for said pin, an axially aligned contact movable by sliding movement of said pin, an axial contact adapted to engage said first-named contact by movement of said pin within said range, slidable means supporting said last-named contact for movement with said first-named contact upon movement of said pin in the portion of the range of movement during which said contacts are engaged, and means for positively restraining movement of said slidable means against movement into the portion of the range of movement of said pin during which said contacts are not engaged.

2. In a gage, a gage frame, a rigid gage pin slidably mounted therein, means for establishing positive limits to a range of sliding movement for said pin, an axially aligned contact movable by sliding movement of said pin, an axial contact adapted to engage said first-named contact by movement of said pin within said range, slidable means supporting said last-named contact for movement with said first-named contact upon movement of said pin in the portion of the range of movement during which said contacts are engaged, means for positively restraining movement of said slidable means against movement into the portion of the range of movement of said pin during which said contacts are not engaged, and means for biasing said second contact against said restraining means.

3. In a gage, a gage frame, a gage pin slidably mounted therein, means to limit the sliding movement of said pin to a range of movement in excess of the allowable tolerances of a dimension to be gaged, electrical contact means closed by movement of said gage pin within said range, said contact means comprising two independent pairs of contacts in axial alignment with said pin and adapted to be set for sequential closing at spaced points within the range of movement of said pin.

4. In a gage, a gage frame, a gage pin slidably mounted therein, means to limit the sliding movement of said pin to a range of movement in excess of the allowable tolerances of a dimension to be gaged, electrical contact means closed by movement of said gage pin within said range, said contact means comprising two pairs of contacts adapted to be set for closing at spaced points within the range of movement of said pin, and indicating means actuated by each of said pairs of spaced contacts.

5. In a gage, a gage frame, a gage pin slidably mounted therein having a gaging end projecting from said frame, means for establishing a range of sliding movement for said pin, a member secured to said gage frame having a bore in alignment with the other end of said pin, a contact carried on the end of said pin, a member slidably disposed within said bore in alignment with said pin, said member having a contact adapted to cooperate with the gage pin contact, and means within said bore for positively limiting movement of said member toward said pin at a point whereby said contacts engage one another within the range of movement of said pin, and means for biasing movement of said member in a direction toward said point.

6. An electrical gage indicator comprising a housing having a bore therein adapted to be mounted in alignment with a gaging pin, spaced sleeve members settably positioned within said bore, a slidable pin coaxially positioned in each sleeve member electrically isolated from each other, a shoulder on each pin engageable with its respective sleeve for limiting movement in one direction, and contacts carried on the adjacent ends of said pins adapted to engage one another upon movement of one of said pins toward the other.

7. An electrical gage indicator comprising a housing having a bore therein adapted to be mounted in alignment with a gaging pin, spaced sleeve members settably positioned within said bore, a slidable pin coaxially positioned in each sleeve member electrically isolated from each other, a shoulder on each pin engageable with its respective sleeve for limiting movement in one direction, contacts carried on the adjacent ends of said pins adapted to engage one another upon movement of one of said pins toward the other, and an electrical indicator carried by said housing, and means in circuit with said contacts for actuating said indicator when engaged.

8. An electrical gage indicator comprising a housing having a bore therein adapted to be mounted in alignment with a gaging pin, spaced sleeve members settably positioned within said bore, a slidable pin coaxially positioned in each sleeve member, electrically isolated from each other, a shoulder on each pin engageable with its respective sleeve for limiting movement in one direction, means biasing each of said pins to a position with its respective shoulder engaged with its respective sleeve, and contacts carried on the adjacent ends of said pins adapted to engage one another upon movement of one of said pins toward the other.

9. An electrical gage indicator comprising a housing having a bore therein adapted to be mounted in alignment with a gaging pin, spaced sleeve members settably positioned within said bore, a slidable pin coaxially positioned in each sleeve member electrically isolated from each other, a shoulder on each pin engageable with its respective sleeve for limiting movement in one direction, means biasing each of said pins to a position with its respective shoulder engaged with its respective sleeve, contacts carried on the adjacent ends of said pins adapted to engage one another upon movement of one of said pins toward the other, and an electrical indicator carried by said housing, and means in circuit with said contacts for actuating said indicator when engaged.

10. In a gage, a frame structure having a bore, a gage pin slidably mounted in said bore, means for limiting the overall movement of said pin in said bore, a slidable contact member in said bore, having opposed contact ends one adapted to engage a contact end of said pin, a second contact member in said bore having a contact adapted to engage the other contact end of said first-named contact member, means for biasing said pin away from said first-named contact member, means for biasing said first-named contact member away from said second member, adjustable stop means for limiting the movement of said first-named contact member toward said gage pin, electrical indicating means energized by contact of said one contact and said pin contact end, and independent electrical indicating means energized by contact of said other contact with the contact of said second member.

11. In a gage, a frame having a gaging surface, said frame having a bore normal to said gaging surface, a gage pin slidably mounted in said bore for movement normal to said surface, means for limiting the over-all movement of said pin in said bore, a slidable contact member in said bore, having opposed contact ends, one adapted to engage a contact end of said pin, a second contact member in said bore having a contact adapted to engage the other contact end of said first-named contact member, means for biasing said pin away from said first-named contact member, means for biasing said first-named contact member away from said second member, adjustable stop means for limiting the movement of said first-named contact member toward said gage pin, electrical indicating means energized by contact of said one contact and said pin contact end, and independent electrical indicating means energized by contact of said other contact with the contact of said second member.

12. In a gage, a frame having a gaging surface, said frame having a bore normal to said gaging surface, a gage pin slidably mounted in said bore for movement normal to said surface, means for limiting the over-all movement of said pin in said bore, a slidable contact member in said bore, having opposed contact ends, one adapted to engage a contact end of said pin, a second slidable contact member in said bore having a contact adapted to engage the other contact end of said first-named contact member, adjustable stop means for limiting the movement of both of said contact members toward said gage pin, means for biasing said pin away from said first-named contact member, means for biasing said first-named contact member away from said second member, means for biasing said second-named contact member toward said pin, electrical indicating means energized by contact of said one contact and said pin contact end, and independent electrical indicating means energized by contact of said other contact with the contact of said second member.

13. In a gage, a frame having a gaging surface, said frame having a bore normal to said gaging surface, a gage pin slidably mounted in said bore for movement normal to said surface, means for limiting the over-all movement of said pin in said bore, a slidable contact member in said bore, having opposed contact ends, one adapted to engage a contact end of said pin, a second slidable contact member in said bore having a contact adapted to engage the other contact end of said first-named contact member, means for biasing said pin away from said first-named contact member, means for biasing said first-named contact member away from said second member, means for biasing said second member in the same direction as the bias of said first member, axially adjustable stop means positioned in said bore for limiting the movement of both of said contact members toward said gage pin and for guiding the sliding movement of said members, electrical indicating means energized by contact of said one contact and said pin contact end, and independent electrical indicating means energized by contact of said other contact with the contact of said second member.

14. In a gage, a frame having a gaging surface, said frame having a bore normal to said gaging surface, a gage pin slidably mounted in one end of said bore for movement normal to said surface, means for limiting the over-all movement of said pin in said bore, screw threads in the other end of said bore, a sleeve threaded in said bore, a slidable contact member in said sleeve, having opposed contact ends, one adapted to engage a contact end of said pin, a second sleeve threaded in said bore, a second contact member in said last-named sleeve having a contact adapted to engage the other contact end of said first-named contact member, means for biasing said pin away from said first-named contact member, means for biasing said first-named contact member away from said second member, means for biasing said second-named contact member in the same direction as the first, shoulders on each of said members for engaging said sleeves to limit movement of the members toward the pin, electrical light indicating means mounted on the frame, energized by contact of said one contact and said pin contact end, and independent electrical light indicating means mounted on the frame, energized by contact of said other contact with the contact of said second member.

15. In a gage, a frame having a gaging surface, said frame having a bore normal to said gaging surface, a gage pin slidably mounted in one end of said bore for movement normal to said surface, means for limiting the over-all movement of said pin in said bore, screw threads in the other end of said bore, a sleeve threaded in said bore, a slidable contact member in said sleeve, having opposed contact ends, one adapted to engage a contact end of said pin, a second sleeve threaded in said bore, a second contact member in said last-named sleeve having a contact adapted to engage the other contact end of said first-named contact member, means for biasing said pin away from said first-named contact member, means for biasing said first-named contact member away from said second member, means for biasing said second-named contact member in the same direction as the first, shoulders on each of said members for engaging said sleeves to limit movement of the members toward the pin, electrical light indicating means mounted on the frame, energized by contact of said one contact and said pin contact end, independent electrical light indicating means mounted on the frame, energized by contact of said other contact with the contact of said second member, and pockets in said frame adapted to receive batteries for energizing said indicating means.

References Cited in the file of this patent

UNITED STATES PATENTS

| Number | Name | Date |
| --- | --- | --- |
| 1,040,715 | Mann | Oct. 8, 1912 |
| 1,602,753 | Davis | Oct. 12, 1926 |
| 1,737,921 | Derr | Dec. 3, 1929 |
| 2,331,669 | Entriken | Oct. 12, 1943 |
| 2,433,585 | Warner | Dec. 30, 1947 |
| 2,474,482 | Lovick | June 28, 1949 |